US010895300B2

(12) United States Patent
Dehlwes et al.

(10) Patent No.: US 10,895,300 B2
(45) Date of Patent: Jan. 19, 2021

(54) AIR SPRING WITH SEVERAL DAMPING DEVICES

(71) Applicant: Vibracoustic CV Air Springs GmbH, Hamburg (DE)

(72) Inventors: Stephan Dehlwes, Norderstedt (DE); Michael Weber, Buchholz (DE)

(73) Assignee: VIBRACOUSTIC CV AIR SPRINGS GMBH, Hamburg (DE)

( * ) Notice: Subject to any disclaimer, the term of this patent is extended or adjusted under 35 U.S.C. 154(b) by 0 days.

(21) Appl. No.: 15/758,766

(22) PCT Filed: Sep. 9, 2016

(86) PCT No.: PCT/EP2016/071368
§ 371 (c)(1),
(2) Date: Mar. 9, 2018

(87) PCT Pub. No.: WO2017/042369
PCT Pub. Date: Mar. 16, 2017

(65) Prior Publication Data
US 2018/0298974 A1 Oct. 18, 2018

(30) Foreign Application Priority Data

Sep. 11, 2015 (DE) .......... 10 2015 115 401

(51) Int. Cl.
*F16F 9/04* (2006.01)
*F16F 9/05* (2006.01)
*B60G 15/12* (2006.01)

(52) U.S. Cl.
CPC ............ *F16F 9/0472* (2013.01); *B60G 15/12* (2013.01); *F16F 9/049* (2013.01); *F16F 9/05* (2013.01); *B60G 2202/314* (2013.01); *B60G 2204/1262* (2013.01)

(58) Field of Classification Search
CPC . F16F 9/0472; F16F 9/049; F16F 9/05; B60G 15/12; B60G 2202/314; B60G 2204/1262
See application file for complete search history.

(56) References Cited

U.S. PATENT DOCUMENTS

| 3,000,625 | A | 9/1961 | Polhemus |
| 3,246,905 | A | 4/1966 | Morgan |
| 4,518,154 | A | 5/1985 | Merkle |
| 7,070,028 | B2 * | 7/2006 | Reybrouck ........... F16F 9/0209 188/282.8 |
| 9,157,529 | B2 | 10/2015 | Westnedge et al. |
| 9,296,272 | B2 * | 3/2016 | Leonard ................ B60G 11/62 |
| 2003/0127781 | A1 | 7/2003 | Fritz |
| 2004/0124051 | A1 | 7/2004 | Lun et al. |
| 2004/0130079 | A1 | 7/2004 | Gold et al. |

(Continued)

FOREIGN PATENT DOCUMENTS

CN 102009578 A 4/2011
DE 2836662 B1 10/1979
(Continued)

*Primary Examiner* — Melanie Torres Williams
(74) *Attorney, Agent, or Firm* — Leydig, Voit & Mayer, Ltd.

(57) ABSTRACT

An air spring for a motor vehicle or a driver's cab of a motor vehicle has a cover, a rolling piston and at least one air spring bellows. At least two damping devices are integrated into the air spring.

11 Claims, 1 Drawing Sheet

(56) References Cited

U.S. PATENT DOCUMENTS

2007/0023981 A1  2/2007  Helming
2008/0290571 A1  11/2008 Krauss
2011/0140323 A1  6/2011  Kwon
2014/0175716 A1  6/2014  Sugata

FOREIGN PATENT DOCUMENTS

| DE | 3526156 A1 | 1/1987 |
|----|---|---|
| DE | 10110321 A1 | 9/2002 |
| DE | 102004012881 A1 | 10/2005 |
| DE | 102005060332 B3 | 2/2007 |
| EP | 1327539 A2 | 7/2003 |
| JP | 2011106488 A | 6/2011 |
| WO | WO 2012054531 A1 | 4/2012 |
| WO | WO 2013181241 A1 | 12/2013 |

* cited by examiner

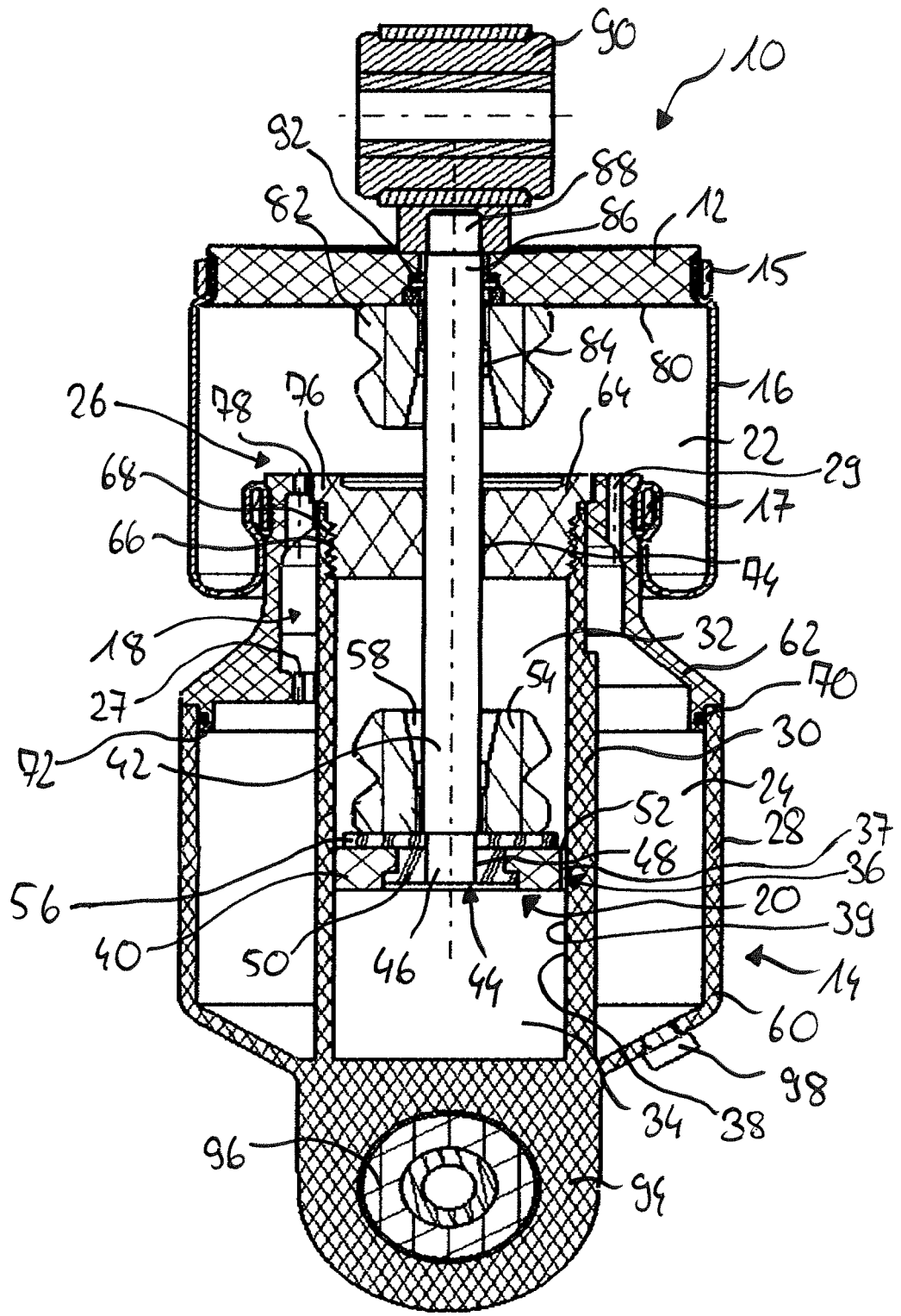

AIR SPRING WITH SEVERAL DAMPING DEVICES

CROSS-REFERENCE TO PRIOR APPLICATIONS

This application is a U.S. National Phase application under 35 U.S.C. § 371 of International Application No. PCT/EP2016/071368, filed on Sep. 9, 2016, and claims benefit to German Patent Application No. DE 10 2015 115 401.3, filed on Sep. 11, 2015. The International Application was published in German on Mar. 16, 2017 as WO 2017/042369 under PCT Article 21(2).

FIELD

The present invention relates to an air spring for a motor vehicle or a driver's cab of a motor vehicle.

BACKGROUND

Air springs of the type mentioned in the introduction are used in a motor vehicle or in a driver's cab in order to provide cushioning between two vehicle components that are movable relative to one another. Moreover, air springs are also used for altering or keeping constant the level position of a motor vehicle or of a driver's cab. Conventional air springs have a rubber air spring bellows connected to a top closure member most frequently configured as a cover and to a rolling piston in order to form a working space sealed in an air-tight manner. The working space is filled with a fluid, in particular compressed air, as a working medium. During spring contraction and extension, the air spring bellows rolls on the outer surface of the rolling piston and thus cushions the vibrations that are introduced. By filling the working space with compressed air or by discharging compressed air from the working space the level position can be altered or kept constant.

In addition to the above-described cushioning function, it is also possible to configure an air spring such that it also has a damping function. Such an air spring may also be referred to as an air spring damper. The damping action is most frequently effected by the working medium flowing back and forth between the working space and another chamber via a damping channel. Due to the constricted cross section of the damping channel and the accompanying friction, the introduced vibrations are damped. Different damping characteristics can be set by varying the damping channel cross section.

SUMMARY

The present invention is based on the object of providing an air spring that has an increased damping action and reduced construction space requirements, and which, additionally, is cost-effective to manufacture.

An air spring as disclosed herein is proposed for achieving the object.

Preferred embodiments of the air spring are the subject matter of the dependent claims.

In an embodiment, an air spring for a motor vehicle or a driver's cab of a motor vehicle has a cover, a rolling piston and at least one air spring bellows, wherein at least two damping devices are integrated into the air spring. By integrating two damping devices into the air spring, the damping action, and thus the damping effect, is increased. Due to the at least two damping devices integrated into the air spring, the air spring is of a compact construction, so that the required construction space of the air spring is reduced. In addition, an external guide for the air spring bellows can be omitted, which simplifies the assembly of the air spring and thus renders its manufacture cost-effective.

The damping devices can employ compressed air or a gas as a working medium. In addition, the damping devices can also use a compressible medium as a working medium. If air or compressed air is used, the damping devices may also be referred to as air spring dampers.

In an advantageous embodiment, the two damping devices are connected in parallel. Thus, the damping action can be increased since both damping devices are active during spring contraction or extension. In addition, two damping actions that are independent of one another can be produced by connecting the two damping devices in parallel.

A first damping device may have a first chamber with a variable volume, a second chamber whose volume remains constant and a first damping channel device connecting the two chambers with each other. The first chamber with a variable volume can be referred to as an active volume, and the second chamber whose volume remains constant can be referred to as a passive volume. During spring contraction and extension, the volume of the variable chamber changes, whereby an overpressure or a negative pressure is created, so that the compressed air located in the chambers or the gas or compressible medium located in the chambers flows back and forth via the damping channel device and thus generates a damping action. By varying the diameter of the damping channel device, it is possible to adapt the damping device to different vibration frequencies. Also advantageously, the first damping channel device can have a damping channel or multiple damping channels that connect the first chamber and the second chamber with each other. Furthermore, the cross section of the damping channel device can be capable of being unblocked and/or shut by means of a valve. Thus, the damping function can be switched on or off, or the damping characteristic can be altered.

In an advantageous embodiment, the first chamber is delimited by the cover, the rolling piston and the air spring bellows, and the second chamber is delimited by the rolling piston, with the first damping channel device being incorporated into the rolling piston. During spring contraction, the volume of the first chamber is reduced, so that the compressed air located in the first chamber or the gas or compressible medium located in the chambers flows via the first damping channel device into the second chamber formed in the rolling piston. During spring extension, the volume of the first chamber increases so that a negative pressure is generated, which causes the compressed air located in the second chamber or the gas or compressible medium located in the chambers to flow via the first damping channel device back into the first chamber. A damping action is produced as a consequence of this reciprocating flow. The first damping channel device can be formed from one damping channel incorporated into the rolling piston and/or multiple damping channels incorporated into the rolling piston.

Advantageously, the second chamber is delimited by an outer wall and an inner wall of the rolling piston. Thus, the volume of the second chamber does not change and always remains constant during a spring contraction and extension of the air spring. Advantageously, the second chamber integrated into the rolling piston constitutes an additional volume.

In an advantageous embodiment, a second damping device has a third chamber with a variable volume, a fourth chamber with a variable volume and a second damping channel device connecting the two chambers with each other. Since the volumes of the third and fourth chambers are variable, these two chambers may also be referred to as active volumes. During spring contraction, the fourth chamber is advantageously compressed and the third chamber is enlarged, wherein the compressed air, the gas or the compressible medium flows via the second damping channel device from the fourth chamber into the third chamber. During spring extension, the volume of the third chamber is advantageously reduced and the volume of the fourth chamber is increased, wherein the compressed air, the gas or the compressible medium flows via the second damping channel device from the third chamber into the fourth chamber. A damping effect is obtained by the reciprocating flow of the compressed air, gas or compressible medium via the second damping channel device. By varying the diameter of the second damping channel device, it is possible to adapt the damping device to different vibration frequencies. Also advantageously, the second damping channel device can have a damping channel or multiple damping channels that connect the third chamber and the fourth chamber with each other. Furthermore, the cross section of the second damping channel device can be capable of being unblocked and shut by means of a valve. Thus, the damping function can be switched on or off, or the damping characteristic can be altered.

Preferably, the chambers are configured as air chambers, in particular as compressed-air chambers. Moreover, the chambers can also be filled with a gas or a compressible medium.

In an advantageous embodiment, the first chamber and the third chamber are connected with each other. Thus, an exchange of compressed air, gas or a compressible medium can take place between the first chamber and the third chamber.

The third chamber and the fourth chamber may be delimited by a cylindrical housing formed in the rolling piston. Advantageously, the cylindrical housing is formed by an inner wall of the rolling piston. Also advantageously, the cylindrical housing is surrounded by the second chamber.

Advantageously, the third chamber and the fourth chamber are separated from each other by a movable piston. Due to a movement of the piston during spring contraction and extension, the volumes of the third and fourth chambers are alternately reduced and increased, wherein the compressed air, the gas or the compressible medium flow back and forth via the second damping channel device.

Advantageously, the second damping channel device is formed between the piston and the cylindrical housing and/or the second damping channel device is incorporated into the piston. The second damping channel device can be formed as a damping channel incorporated into the piston, which connects the third chamber and the fourth chamber with each other. Furthermore, the second damping channel device can be formed by a gap formed between the piston and the inner face of the cylindrical housing. To this end, the piston can be spaced from an inner face of the cylindrical housing. Furthermore, the second damping channel device can have multiple damping channels. For example, a damping channel can be incorporated into the piston and another damping channel can be formed by a gap formed between the piston and the inner face of the cylindrical housing. Advantageously, the piston is guided within the cylindrical housing.

Advantageously, the piston is connected to a piston rod, the piston rod being attached to the cover. During a spring contraction and extension, the piston is moved back and forth within the housing by means of the piston rod.

In an advantageous embodiment, the piston has a first buffer that limits a movement of the piston. Preferably, the first buffer cooperates with the housing, in particular with its cover member. The first buffer can be disposed on a surface of the piston facing towards the cover member. Advantageously, the first buffer is provided with a passageway through which the piston rod can extend. Advantageously, the first buffer is made of an elastomeric material. Alternatively, the buffer can be disposed on an underside of the piston facing towards the fourth chamber, or within the fourth chamber. Also advantageously, the first buffer is configured to be soft in order to obtain a soft characteristic curve during an impact. The first buffer can be connected to the piston by substance-to-substance connection.

Advantageously, the rolling piston is formed from multiple parts. Thus, the piston is easy to insert into the housing.

In an advantageous embodiment, the rolling piston comprises a bottom part, a top part having a rolling contour, and a cover member, the cover member being connectable to the bottom part and the top part in such a way that all parts are fixed relative to one another. Preferably, the second chamber and the housing delimiting the third and fourth chambers are formed in the bottom part. Advantageously, the cover member is connected to the bottom part by force fit and/or positive fit. For this purpose, the cover member can be provided with a male thread that can be screwed into a female thread formed on the bottom part. Advantageously, the cover member can be screwed into the housing. Advantageously, the cover member is provided with a passageway through which the piston rod can extend. Advantageously, the passageway connects the first chamber and the third chamber. Also advantageously, the first damping channel device is incorporated into the top part. In order to assemble the rolling piston, the top part can be placed on the bottom part, wherein a seal member, in particular an O-ring, can be interposed between the top part and the bottom part for sealing. Then, the cover member can be connected to the bottom part, in particular screwed into the bottom part, preferably into the female thread formed on the cylindrical housing. In the process, the cover member braces the top part against the bottom part and thus fixes all the parts relative to one another. Advantageously, the cover member has a peripheral projection that can engage with a recess formed on the top part in order thus to brace and fix the top part against the bottom part In an advantageous embodiment, the rolling piston is made from plastic, in particular from a fiber reinforced plastic.

Advantageously, the cover has a second buffer that limits a movement of the cover and/or of the rolling piston. Advantageously, the second buffer is disposed on a side of the cover facing towards the first chamber. Also advantageously, the second buffer has a passageway through which the piston rod can extend. During a spring contraction and extension, the second buffer limits a movement of the cover and/or the rolling piston. Advantageously, the second buffer is made of an elastomeric material. Also advantageously, the first buffer is configured to be soft in order to obtain a soft characteristic curve during an impact. The second buffer can be connected to the cover by substance-to-substance connection.

The rolling piston may have a connecting device for connecting a compressed-air source. Furthermore, the connecting device may be connected to a gas source or a source with a compressible medium. The air spring can be filled with compressed air, gas or a compressible medium, or compressed air, gas or a compressible medium may be discharged, via the connecting device. Thus, a desired level of the driver's cab or of the motor vehicle at different loads or weight loads can be kept constant or adjusted.

BRIEF DESCRIPTION OF THE DRAWINGS

The air spring is explained below in more detail with reference to an exemplary embodiment that is depicted in the attached schematic drawing. The invention is not limited to the exemplary embodiment. In the drawing:

FIG. 1 is a longitudinal section through an air spring.

DETAILED DESCRIPTION

FIG. 1 shows an air spring 10, which serves for supporting and damping a driver's cab that is not shown or of a motor vehicle that is not shown.

The air spring 10 has a cover 12, a rolling piston 14 and an air spring bellows 16 connecting the cover 12 and the rolling piston 14 with each other, wherein the air spring bellows 16 is attached in an air tight manner to the cover 12 by means of a first clamp ring 15 and to the rolling piston 14 by means of a second clamp ring 17. In addition, a first damping device 18 and a second damping device 20 are integrated into the air spring 10, with the two damping devices 18, 20 being connected in parallel to each other.

The first damping device 18 has a first chamber 22 with a variable volume, a second chamber 24 whose volume remains constant and a first damping channel device 26 connecting the two chambers 22, 24 with each other. The first damping channel device 26 comprises a first damping channel 27 and a second damping channel 29 that connect the first chamber 22 and the second chamber 24 with each other. The first chamber 22 is delimited by the cover 12, the rolling piston 14 and the air spring bellows 16. The second chamber 24 is integrated into the rolling piston 14 as an additional volume and is delimited by an outer wall 28 and an inner wall 30 of the rolling piston 14. The first damping channel 27 and the second damping channel 29 that connect the two chambers 22, 24 to each other are incorporated into the rolling piston 14.

The second damping device 20 has a third chamber 32 with a variable volume, a fourth chamber 34 with a variable volume and a second damping channel device 36 connecting the two chambers 32, 34 with each other. The two chambers 32, 34 are delimited by a cylindrical housing 38 formed by the inner wall 30. A movable piston 40, which separates the two chambers 32, 34 from each other, is disposed within the cylindrical housing 38. The second damping channel device 36 has a third damping channel 37. The third damping channel 37 is formed by a gap formed between the piston 40 and an inner face 39 of the cylindrical housing 38. The piston 40 is guided within the cylindrical housing 38.

The piston 40 is connected to a piston rod 42, which is attached on its end to the cover 12. At its first end 44, the piston rod 42 is connected to the piston 42. For this purpose, the piston rod 42 has a first threaded portion 46 that is inserted into a first passageway 48 of the piston 42. In order to fix the piston rod 42 to the piston 40, a nut 50 is then screwed onto the first threaded portion 46 from below.

A first buffer 54, which is preferably made from an elastomeric material, is disposed on a top side 52 of the piston 40. The first buffer 54 is disposed on a plate 56, in particular connected thereto by substance-to-substance connection, with the plate 56 resting on the top side 52 of the piston 40 and being fixed to the piston 40 via the piston rod 42 and the nut 50. In addition, the first buffer 54 is provided with a second passageway 58, through which the piston rod 42 extends.

The rolling piston 14 is formed from multiple parts and has a bottom part 60, a top part 62 having a rolling contour and a cover member 64. The second chamber 24 and the cylindrical housing 38 delimiting the third chamber 32 and the fourth chamber 34 are formed in the bottom part 60. The air spring bellows 16 is attached to the top part 62 by means of the second clamp ring 17. During a spring contraction, the air spring bellows 16 rolls over the outer contour, or the outer contour forming the one rolling contour, of the top part 62. The bottom part 60 and the top part 62 are connected to each other via the cover member 64. For this purpose, the cover member 64 has a male thread 66 that can be screwed into a female thread 68 of the cylindrical housing 38. In order to assemble the rolling piston 14, the top part 62 is placed on the bottom part 60, wherein a first sealing member 70, in particular an O-ring, is interposed between the top part 62 and the bottom part 60. To this end, the top part 62 has a peripheral rim 72 with a groove into which the first sealing member 70 can be inserted. Then, the piston 40, together with the piston rod 42 attached thereto and the first buffer 54, is inserted into the cylindrical housing 38 and closed by means of the cover member 64. For this purpose, the cover member 64 has a third passageway 74 through which the piston rod 42 can extend when the cover member 64 is pushed onto the piston rod 42 and finally screwed into the female thread 68. The first chamber 22 and the third chamber 32 can be connected to each other via the passageway 74. The cover member 64 has a peripheral projection 76 that engages with a recess 78 formed on the top part 62 and thus braces and fixes the top part 62 against the bottom part 60.

A second buffer 82 is disposed at an underside 80 of the cover 12; in particular, the second buffer 82 is connected by a substance-to-substance connection to the underside 80 of the cover 12. The second buffer 82 is made from an elastomeric material and has a fourth passageway 84 through which the piston rod 42 extends. In addition, the piston rod 42 extends through the cover 12 and has at its second end 86 a second threaded portion 88, onto which a first elastomer bearing 90 is screwed. The first elastomer bearing 90 fixes the piston rod 42 on the cover 12. In order to seal the first chamber 22 with respect to the environment, a second sealing member 92, in particular an O-ring, is disposed between the cover 12 and the piston rod 42. The rolling piston 14, in particular the bottom part 60, additionally has an accommodating portion 94 into which a second elastomer bearing 96 is inserted, in particular pressed.

The rolling piston 14, particularly in the region of the second chamber 24, is provided with a connecting device 98, which can be connected with a compressed-air source that is not shown, a gas source that is not shown or a source with a compressible medium that is not shown. The air spring 10 can be filled with compressed air, gas or a compressible medium, or compressed air, gas or a compressible medium may be discharged, via the connecting device 98. Thus, it is possible to keep constant or set a desired level of a driver's cab or of a motor vehicle at different loads or weight loads.

The damping action of the air spring 10 in case of a spring contraction or extension is described below. During the spring contraction, the air spring bellows 16 rolls on the top part 62 so that the first chamber 22 is compressed. Thus, the compressed air located in the first chamber 22 or the gas or compressible medium located in the first chamber 22 flows via the first damping channel 27 and the second damping channel 29 into the second chamber 24 and thus generates a first damping effect. At the same time, the piston 40 is moved downwards by means of the piston rod 42 during a spring contraction, so that the volume of the third chamber 32 increases and the volume of the fourth chamber 34 is reduced at the same time. Thus, the compressed air, the gas or the compressible medium flows from the fourth chamber 34 via the third damping channel 37 into the third chamber 32 and thus generates a second damping effect in parallel to the first damping effect. The spring contraction is limited by the second buffer 82 abutting against the cover member 64. During a spring extension, the first chamber 22 is enlarged, so that, due to the negative pressure generated in the first chamber 22, the compressed air located in the second chamber 24 or the gas or compressible medium located in the first chamber 22 flows via the first damping channel 27 and the second damping channel 29 into the first chamber 22 and thus obtains a first damping effect. At the same time, the piston 40 is displaced in an upward direction during a spring extension, so that the third chamber 32 is compressed and the fourth chamber 34 is enlarged, with compressed air, gas or compressible medium flowing from the third chamber 32 via the third damping channel 37 into the fourth chamber 34, thus causing a second damping effect in parallel to the first damping effect. The spring extension is limited by the first buffer 54 abutting against the cover member 64.

The air spring 10 is characterized by the integration of two damping devices 18, 20 connected in parallel. Thus, the damping action can be increased and the construction space required for the air spring 10 can be reduced at the same time. In addition, an external guide for the air spring bellows 16 can be omitted, so that the assembly is simplified and the air spring 10 can be manufactured cost-effectively at the same time.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

10 Air Spring
12 Cover
14 Rolling piston
15 First clamp ring
16 Air spring bellows
17 Second clamp ring
18 First damping device
20 Second damping device
22 First chamber
24 Second chamber
26 First damping channel device
27 First damping channel
28 Outer wall
29 Second damping channel
30 Inner wall
32 Third chamber
34 Fourth chamber
36 Second damping channel device
37 Third damping channel
38 Cylindrical housing
39 Inner face
40 Piston
42 Piston rod
44 First end
46 First threaded portion
48 First passageway
50 Nut
52 Top side
54 First buffer
56 Plate
58 Second passageway
60 Bottom part
62 Top part
64 Cover member
66 Male thread
68 Female thread
70 First sealing member
72 Rim
74 Third passageway
76 Projection
78 Recess
80 Bottom side
82 Second buffer
84 Fourth passageway
86 Second end
88 Second threaded portion
90 First elastomer bearing
92 Sealing member
94 Accommodation portion
96 Second elastomer bearing
98 Connecting device

The invention claimed is:

1. An air spring for a motor vehicle or a driver's cab of a motor vehicle comprising:
   a cover,
   a rolling piston,
   at least one air spring bellows, and
   at least two damping devices integrated into the air spring, the at least two damping devices comprising a first damping device and a second damping device,
   wherein the first damping device has a first chamber with a variable volume, a second chamber whose volume remains constant, and a first damping channel device connecting the first and second chambers,
   wherein the second damping device has a third chamber with a variable volume, a fourth chamber with a variable volume, and a second damping channel device connecting the third and fourth chambers, wherein the rolling piston is formed from multiple parts and comprises a bottom part, a top part having a rolling contour, and a cover member, and wherein the second chamber and a cylindrical housing delimiting the third chamber and the fourth chamber are formed in the bottom part.

2. The air spring according to claim 1, wherein the at least two damping devices are connected in parallel.

3. The air spring according to claim 1, wherein the first chamber is delimited by the cover, the rolling piston and the air spring bellows, and the second chamber is delimited by the rolling piston, with the first damping channel device being incorporated into the rolling piston.

4. The air spring according to claim 3, wherein the second chamber is delimited by an outer wall and an inner wall of the rolling piston.

5. The air spring according to claim 1, wherein the third chamber and the fourth chamber are separated from each other by a movable piston.

6. The air spring according to claim 1, wherein the second damping channel device is formed between the movable piston and the cylindrical housing, and/or that the second damping channel device is incorporated into the movable piston.

7. The air spring according to claim 5, wherein the movable piston is connected to a piston rod, the piston rod being attached to the cover.

8. The air spring according to claim 5, wherein the movable piston has a first buffer that limits a movement of the movable piston.

9. The air spring according to claim 1, wherein the cover has a second buffer that limits a movement of the cover and/or of the rolling piston.

10. The air spring according to claim 1, wherein the working medium comprises compressed air, and wherein the rolling piston has a connecting device for connecting a compressed-air source.

11. The air spring according to claim 1, wherein the cover member is connectable to the bottom part and the top part such that the cover member, bottom part, and top part are fixed relative to one another.

* * * * *